US009056780B2

(12) United States Patent
Bracilovic et al.

(10) Patent No.: US 9,056,780 B2
(45) Date of Patent: *Jun. 16, 2015

(54) BOUNDARY LAYER CARBONATION OF TRONA

(71) Applicant: CHURCH & DWIGHT CO., INC., Princeton, NJ (US)

(72) Inventors: Dragomir M. Bracilovic, Princeton, NJ (US); Andrew D. Kurtz, Amherst, NH (US); Joseph A. Paluzzi, Hightstown, NJ (US); Zbigniew M. Senk, Bayonne, NJ (US)

(73) Assignee: CHURCH & DWIGHT CO., INC., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,046

(22) Filed: Jul. 10, 2014

(65) Prior Publication Data

US 2014/0322111 A1    Oct. 30, 2014

Related U.S. Application Data

(63) Continuation of application No. 13/690,440, filed on Nov. 30, 2012, now Pat. No. 8,795,615, which is a continuation of application No. 13/349,946, filed on Jan. 13, 2012, now Pat. No. 8,409,533.

(51) Int. Cl.
*C01D 7/10* (2006.01)
*C22B 26/10* (2006.01)

(52) U.S. Cl.
CPC ............. *C01D 7/10* (2013.01); *Y10T 428/2982* (2015.01); *C22B 26/10* (2013.01)

(58) Field of Classification Search
None
See application file for complete search history.

(56) References Cited

U.S. PATENT DOCUMENTS

| 276,990 | A | 5/1883 | Carey et al. |
| 574,089 | A | 12/1896 | Hawliczek |
| 3,138,167 | A | 6/1964 | Fisher |
| 3,846,535 | A | 11/1974 | Fonseca |
| 4,385,039 | A | 5/1983 | Lowell et al. |
| 4,459,272 | A | 7/1984 | Krieg et al. |
| 4,571,175 | A | 2/1986 | Bogle et al. |
| 4,588,569 | A | 5/1986 | Cyran et al. |

(Continued)

FOREIGN PATENT DOCUMENTS

| JP | 56149317 | 11/1981 |
| WO | 9311070 A1 | 6/1993 |

OTHER PUBLICATIONS

The PCT International Search Report for the corresponding International PCT Application—PCT/US2013/020609—International Searching Authority dated Mar. 22, 2013.

*Primary Examiner* — Melissa Swain
(74) *Attorney, Agent, or Firm* — Womble, Carlyle, Sandridge & Rice, LLP; Ryan Cagle (57) ABSTRACT

A boundary layer carbonation process for producing sodium bicarbonate crystals having specific surface area in the range $0.4\ m^2/g$ to $2.5\ m^2/g$ from Trona, wherein in one embodiment the process comprises the steps of: providing Trona particles having a particle size range of −4+120 mesh; pre-wetting the Trona particles with water to provide a plurality of pre-wetted Trona particles each having a liquid water solution boundary layer deposited thereon; and carbonating the pre-wetted Trona particles across the water boundary layer to provide a product comprising sodium bicarbonate crystals.

11 Claims, 5 Drawing Sheets

(56) References Cited

U.S. PATENT DOCUMENTS

| | | |
|---|---|---|
| 4,664,893 A | 5/1987 | Sarapata et al. |
| 4,919,910 A | 4/1990 | Kurtz et al. |
| 5,741,066 A | 4/1998 | Presnell |
| 7,255,841 B2 | 8/2007 | Kurtz |
| 8,409,533 B1 * | 4/2013 | Bracilovic et al. ............ 423/208 |
| 8,795,615 B2 * | 8/2014 | Bracilovic et al. ............ 423/208 |
| 2004/0224874 A1 | 11/2004 | Jagannath et al. |
| 2011/0049275 A1 | 3/2011 | Zickell et al. |

* cited by examiner

FIG. 1

|  | 1 TRONA FEED | 2 TRIGGER WATER IN | 3 CO₂ FEED | 4 HOT WET CO₂ | 5 COLD CO₂ | 6 EXCESS WATER OUT | 7 WET FGDB² OUT |
|---|---|---|---|---|---|---|---|
| MASS, kg/hr | | | | | | | |
| Sesqui¹ | 42.2 | | | | | | |
| NaHCO₃ | 0.9 | 3.6 | | | | | 47.0 |
| Water | | | | | | 7.4 | 0.5 |
| Impurities | 2.5 | | | | | | 2.5 |
| CO₂ | | | 8.2 | | | | |
| TOTAL | 45.6 | | | | | | 50.0 |
| VOLUME | | | | | | | |
| Solids, CFH | 0.65 | | | | | | 1.0 |
| Gas, SCFM | | | | | | | |
| Gas, ACFM | | | | | | | |
| Temp. °F | 21 | 21 | 21 | 185 | | | |
| Temp. °C | 70 | 70 | 70 | 85 | | | |
| Presure, psig | | | | 5 | 5 | | |

Note 1: "Sesqui" is an abbreviation of Sodium sesquicarbonate.
Note 2: "FGDB" is an abbreviation for Fluid gas desulfurization bicarbonate, i.e., the bicarbonate produced by the invention can be used as a sorbent in the desulfurization of flue gases.

FIG. 2

TABLE 2. BOUNDARY LAYER CARBONATION BATCH REACTOR
TRONA PARTICLE SIZE INFLUENCE ON REACTION RATE

22 LITER BATCH REACTOR  
PLOUGH AGGITATORS

STARTING MATERIAL: 2.5 KG OF TRONA  
TRIGGER WATER: 188 grams  
GAS PHASE RECYCLE: ON

| CUT. Mesh | CUT. microns | MEAN TRONA SIZE. microns | RUN | RPM | TEMPERATURE START. deg.F | TEMPERATURE END. deg.F | TIME TO 98+ min. |
|---|---|---|---|---|---|---|---|
| -120 | -125 | 62 | 239-1 | 36 | 68 | 72 | 8 |
| -60 | -250 | 125 | 263-1 | 72 | 68 | 74 | 10 |
| -60+120 | -250 +125 | 187 | 245-1 | 72 | 67 | 72 | 12 |
| -40+60 | -425 +250 | 337 | 229-2 | 36 | 67 | 71 | 20 |
| -12+40 | -1,200 +425 | 812 | 211-1 | 144 | 70 | 72 | 30+ |
| -40+200 | -425 +75 | 250 | 266-2 | 72 | 69 | 73 | 12 |

Starting material for run 266-2 was pure sodium sesquicarbonate, trigger water amount: 170 grams

BOUNDARY LAYER CARBONATION OF TRONA

RELATED APPLICATION

This application is a continuation of U.S. patent application Ser. No. 13/690,440, filed on Nov. 30, 2012 and U.S. patent application Ser. No. 13/349,946, filed Jan. 13, 2012 and issued on Apr. 2, 2013 as Pat. No. 8,409,533 and entitled "BOUNDARY LAYER CARBONATION OF TRONA", the contents of which are incorporated in their entirety herein by reference.

FIELD OF THE INVENTION

This invention relates to a process for the boundary layer carbonation of solid particulate Trona ore to produce sodium bicarbonate. Impure Trona ore is generally comprised of mixtures of sodium sesquicarbonate ($Na_2CO_3.NaHCO_3.2H_2O$) with other, materials, e.g., alkali minerals such as sodium chloride and sodium sulfate, as well as shales and clays. The invention also relates to such a process for the production of sodium bicarbonate useful in the desulfurization of flue gas.

BACKGROUND OF THE INVENTION

The conventional technique utilized in the commercial production of sodium bicarbonate is the solution process. In the solution process, soda ash is dissolved in spent reaction liquor from prior reaction, consisting of water and small quantities of dissolved soda ash and sodium bicarbonate. The solution is then carbonated by sparging $CO_2$ to the bottom of large carbonate columns to precipitate crystals of sodium bicarbonate. Carbonation of sodium bicarbonate is an example of a gas-liquid-solid reaction. The sodium bicarbonate crystals are typically separated from the liquor using centrifuges and dried to yield highly purified, high density crystals. Disadvantages of the conventional method are that the procedure requires several steps, and necessitates the use of separation equipment, drying of the product, and the handling of large volumes of liquids.

It has also been proposed to make sodium bicarbonate by various "dry carbonation" techniques. In U.S. Pat. No. 276,990 (Carey et al.) and U.S. Pat. No. 574,089 (Hawliczek), a sodium bicarbonate product is formed by placing hydrated soda ash in a revolving cylinder and then introducing carbon dioxide into the cylinder. In both patents, reaction times are of the order of five to six hours.

U.S. Pat. No. 3,647,365 (Saeman) teaches a process in which hollow sodium bicarbonate beads of low density are prepared in a multistage reactor from hydrated soda ash, small amounts of water and carbon dioxide. This process requires several steps and must proceed slowly, with carbonation times exceeding one hour and drying times up to eight hours. The soda ash must first be hydrated in a separate step, and the reaction must occur at a temperature above 95.7° F. to produce commercially acceptable reaction rates.

More recently, Krieg et al. (U.S. Pat. No. 4,459,272), (owned by the assignee of the present invention) described a process for the preparation of sodium bicarbonate by the reaction of a solid, particulate sodium carbonate-containing material with liquid water in a carbon dioxide-rich atmosphere. In the Krieg process, the particulate mass is mixed with the water and carbon dioxide in an internally agitated or externally rotated or vibrated reactor. The reaction is carried out at temperatures of from 125° F. to 240° F. under atmospheres containing from 20% to 90% carbon dioxide by volume. Using Krieg's terminology, the "dry carbonation" process is carried out under reduced water vapor partial pressures to promote evaporation of water from the surfaces of the reacting carbonate particles, and to maintain high carbon dioxide partial pressures in the reactor atmosphere. Products formed by the process have apparent bulk densities as high as 50-60 lb/ft$^3$.

On the other hand, Sarapata, et al. in U.S. Pat. No. 4,664,893 (also owned by the assignee of the present invention) disclose that in the dry carbonation of sodium carbonate, it is necessary to react a substantially saturated feed gas stream (relative humidity in excess of 90%) to maintain adequate reaction rates.

Kurtz, et al. in U.S. Pat. No. 4,919,910 (also owned by the assignee of the present invention) disclose a process for the dry carbonation of potassium carbonate, which comprises reacting dry potassium carbonate, carbon dioxide and water vapor at atmospheric pressure and under turbulent mixing conditions to produce potassium bicarbonate.

WO 93/11070, published Jun. 10, 1993 and issued to Falotico and owned by the assignee of the present invention, a process is provided for the dry carbonation of Trona, which comprises:

(a) passing Trona particles through a reaction zone (e.g., an internally agitated or externally rotated or vibrated reactor);

(b) introducing into the reaction zone a gas stream containing from about 12% to 100% carbon dioxide by volume, any remaining percentage of the gas stream being an inert gas such as air or nitrogen, the gas stream being heated to a temperature within the range of about 140° F. to about 160° F. [about 60° to about 71.1° C.], preferably about 150° F. to about 155° F. [about 65.6° to about 68.3° C];

(c) initiating the reaction by introducing water into the reaction zone to form a gas mixture of water vapor and the gas stream from step (b), so that the water vapor content of the gas mixture reaches essentially 100% of saturation at the temperature of the gas stream from step (b);

(d) thereafter during the course of the reaction, intermittently introducing water into the reaction zone to form "a gas mixture of water vapor and the gas stream from step (b), so that the water vapor content of the gas mixture reaches essentially 100% of saturation at the temperature of the gas stream from step (b), if required to maintain the reaction with a gas stream containing less than 100% $CO_2$;

(e) maintaining the gas mixture or gas stream in direct contact with the Trona particles during the reaction and continuing the reaction with production of water from the Trona and no external source of water when the gas stream is close to 100% $CO_2$, until the sodium carbonate in the Trona particles is essentially all converted to sodium bicarbonate with a water content of less than about 4 percent by weight;

(g) discharging the gas stream or gas mixture from the reaction zone after contact with the particles, and (h) discharging from the reaction zone reacted particles having a lower bulk density, a higher specific surface area and consequently higher absorption property than the Trona feed, and a water content of less than 4 percent by weight and different amounts of impurities (up to 20%) depending on their presence in the starting Trona ore, wherein sodium bicarbonate product formed by the dry carbonation has a surface area of about 0.3 m$^2$/g. In contrast "wet" produced sodium bicarbonate has a surface area from about 0.05 to 0.09 m²/g.

Unfortunately, the process as proposed in WO 93/11070 requires at least 3 hours to convert the Trona to at least 98% sodium bicarbonate during a continuous reaction.

Prior art "dry carbonation" techniques are subject to particular disadvantages. In some of these processes, the carbon dioxide concentration must be high and the reaction temperature must also be high, or the reaction rate is prohibitively low. In some, the product must be dried. Despite a passing reference to the use of calcined Trona in U.S. Pat. No. 4,459,272, none of the patents disclose the surprising benefits and properties that result from the boundary layer carbonation process of the present invention.

Sodium bicarbonate has also been produced, as well as utilized, in dry sorbent injection processes for removing sulfur dioxide emissions from the combustion gases of fossil fuel-fired burners. Such techniques have commanded considerable attention recently, particularly because they present the lowest "first cost" alternative for removing potentially dangerous sulfur dioxide and other gases from flue gases. Sodium bicarbonate has been demonstrated to be a very effective sorbent in the dry sorbent injection process. However, the cost of pharmaceutical and food grade sodium bicarbonate, as currently produced, is a major drawback to its use for such purpose.

U.S. Pat. No. 3,846,535 (Fonseca) and U.S. Pat. No. 4,385,039 (Lowell et al.) disclose, methods for regenerating sodium bicarbonate from sulfate-containing solid waste formed by dry sorbent injection with sodium bicarbonate. The Fonseca regeneration step is carried out by forming an aqueous solution of the sodium sulfate-containing waste, and treating such solution with ammonium bicarbonate to precipitate sodium bicarbonate. The sodium bicarbonate is then separated, dried and recycled for further use. Lowell et al. disclose a regeneration step which involves dissolving the solid desulfurization reaction product in an alkaline liquor, which contains borate ions and/or ammonia. Carbonation of this liquor results in a sodium bicarbonate precipitate. The Fonseca and Lowell et al. processes thus both suffer from the use of complicated and capital intensive solution operations.

Sarapata, et al. in U.S. Pat. No. 4,664,893, mentioned above, also disclose that their "dry carbonation" process may be used to desulfurize flue gas streams, wherein the flue gas is contacted with a solid alkali metal or ammonium bicarbonate containing sorbent to react with sulfur dioxide in the flue gas. The resulting solid waste is separated and removed from the gas stream. The cleansed gas stream, from which the solid waste has been removed, is cooled; the gas stream is saturated with water vapor; and the gas stream is thoroughly mixed with a particulate alkali metal or ammonium carbonate. The bicarbonate produced thereby is then utilized to contact the hot flue gas for further desulfurization thereof.

SUMMARY OF THE INVENTION

This patent discloses a boundary layer carbonation process for the production of sodium bicarbonate from Trona. In one embodiment the process comprises the steps of: providing Trona particles; pre-wetting the Trona particles with water to provide a plurality of pre-wetted Trona particles; and boundary layer carbonating the pre-wetted Trona particles to convert the pre-wetted Trona particles into crystals of sodium bicarbonate having a surface area between 0.7 m²/g and 1.6 m²/g.

PREFERRED EMBODIMENTS OF THE INVENTION

This invention is directed to a process for the boundary layer carbonation of Trona ore to produce sodium bicarbonate. The process of the invention can be conducted in a batch or continuous manner. For most purposes, the continuous manner is preferred. The sodium bicarbonate so produced can be used as a sorbent in the desulfurization of flue gases.

The materials used in the present invention are impure ores, or mixtures of Trona sodium sesquicarbonate ($Na_2CO_3 \cdot NaHCO_3 \cdot 2H_2O$) with other materials, e.g., alkali minerals such as sodium chloride and sodium sulfate, as well as shales and clays. The impurities in Trona are not removed by the boundary layer carbonation although they are slightly diluted due to the increase in mass as a result of the reaction stoichiometric ratios.

In the following description, the process of the invention will be illustrated in connection with the preferred carbonation of Trona. It will, however, be understood that the invention is not limited to the use of Trona, as any of the other sodium carbonate-containing ores can be employed therein.

A suitable particle size range is between 37 microns to 500 microns inclusively (i.e., from and including 37 microns to and including 500 microns). Other suitable particle size ranges are between 53 microns and 500 microns inclusively, between 104 microns and 354 microns inclusively, and 125 microns to 354 microns inclusively. The limit to size range is determined largely by avoiding agglomeration of the particles. All ranges quoted in this patent including the claims section are inclusive ranges. The particle size of Trona particles can be between 2 and 5 microns inclusively providing that the mixing process is preventing or not causing agglomeration. Other suitable particle size ranges (expressed in US Standard mesh units) are: −4+120 mesh, −20+60 mesh, −50+140 mesh, −60+120 mesh, and −140+270 mesh. Broadly, the particle size range can be between 1 and 4,000 microns or between 1 and at least 4,000 microns.

The smaller the average diameter of the particles, the faster the carbonation but also, the greater the propensity for agglomeration which deleteriously affects conversion kinetics. Undesirable particle agglomeration is counteracted in the present invention by imposing a mixing regime that reduces the likelihood of agglomeration. In one non-limiting embodiment of the invention particle agglomeration is achieved using a blender having a shaft with rotating paddles rotating substantially perpendicular to the blender shaft. Alternatively, a helical mixing apparatus is attached to the ribbon blender shaft with a back-angle between 2° and 20° inclusively. Such a back-angle works to cause radial mixing in preference to backward and forward axial mixing. Ribbon blenders are described, for example, in U.S. Pat. Nos.: 3,138,167 and 5,741,066; 3,138,167 and 5,741,066 are incorporated herein by reference in their entirety.

The portion of mixing of the particles in the reaction vessel, such as reactor vessel 180, is apportioned: at least 40% of total mixing inside the reactor vessel is achieved by radial mixing; other ranges for radial mixing are between 40% and 90% of total mixing of the particles in the reactor vessel. By applying a back-angle that considerably retards the forward flow of the particles in the reaction vessel 180 but not sufficient to stop the flow helps to achieve a desired amount of radial mixing as a portion of total mixing in the reactor vessel. More specifically, the blender is not used primarily to propel the particulates through the reactor vessel but to provide a required amount of radial mixing of the Trona particles and prevent the $CO_2$ bulk transfer through the Trona bed from becoming the boundary layer carbonation rate limiting step.

Figure 4:
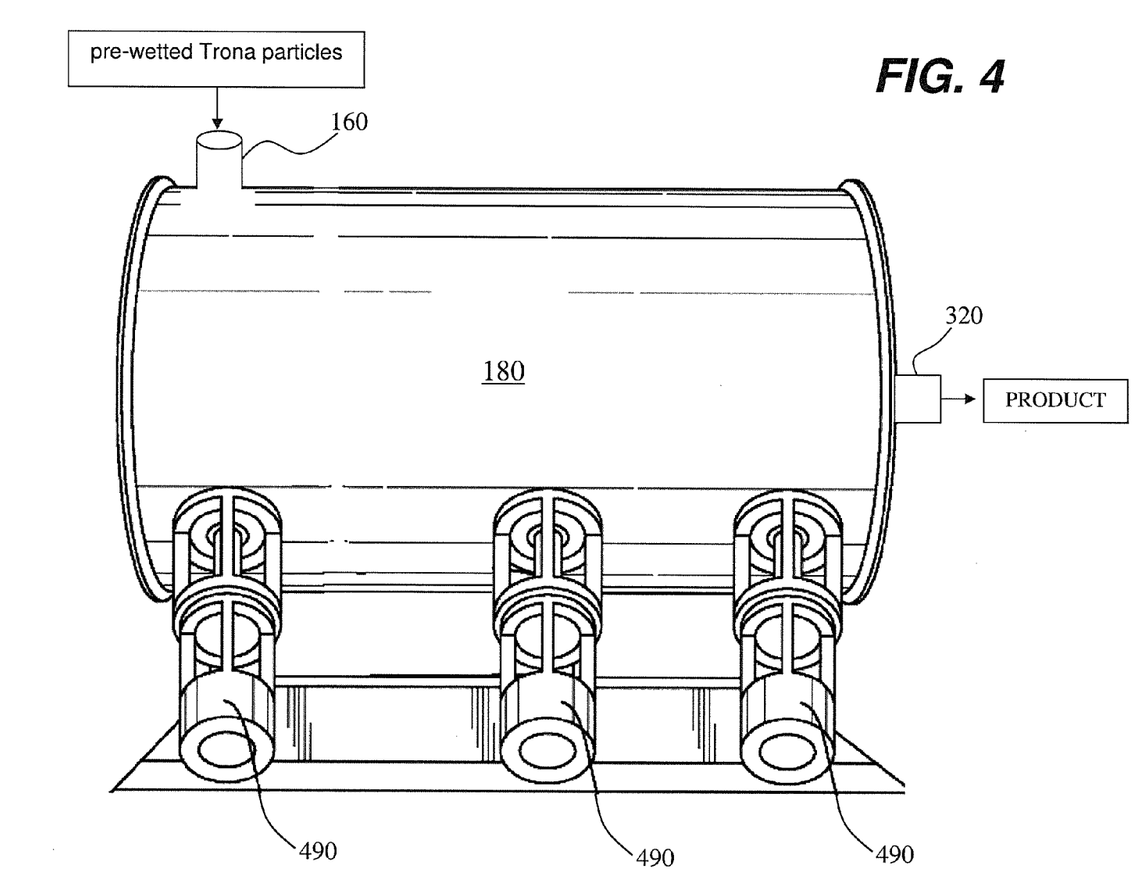
FIG. 4 shows an example of a reactor vessel.
Figure 5:
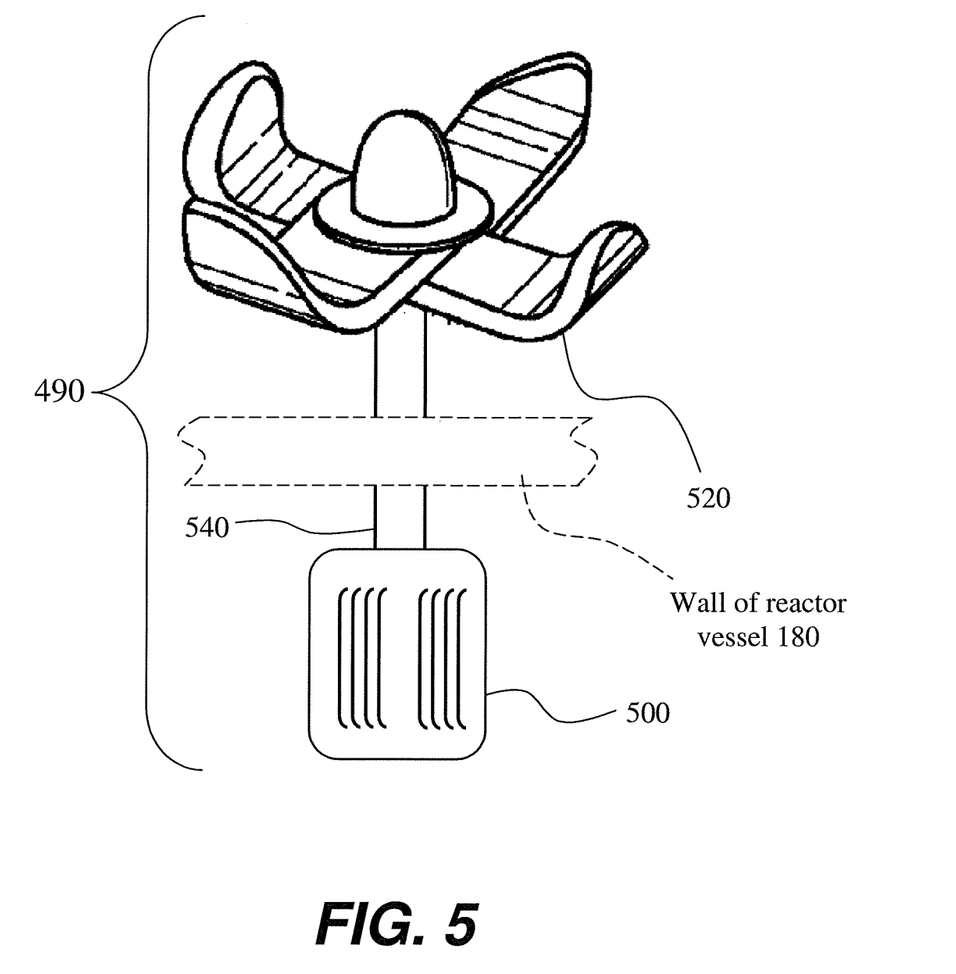
FIG. 5 shows a tulip-shaped chopper.

At least one but preferably a plurality of chopper units 490 can be used to counter agglomeration inside the reactor 180 (FIG. 4). In one embodiment the chopper units 490 each include a chopper head 520 (FIG. 5). The chopper head 520 can have the overall shape of a tulip. The tulip-shaped choppers heads 520 are used to counter agglomeration inside the reactor 180; the tulip-shaped choppers 520 are each rotated by any suitable motor 500 via any suitable power transfer mechanism such as a shaft 540 (see FIG. 5). The chopper units 490 and hence the tulip-shaped choppers 520 can be mounted at any suitable spot with respect to the reactor 180. The boundary layer carbonation process can also be facilitated by use of a reactor fitted with paddle mixer equipped with high speed flat or tulip chopper blades or a ribbon blender equipped with high speed flat or tulip chopper blades. Tulip-shaped choppers, paddles and their use are described, for example, in U.S. Patent Publication No. 20110049275 filed on Mar. 3, 2011, issued to Zickell, and assigned to Advanced Recycling Technology. U.S. Patent Publication No. 20110049275 is incorporated herein by reference.

Figure 1:
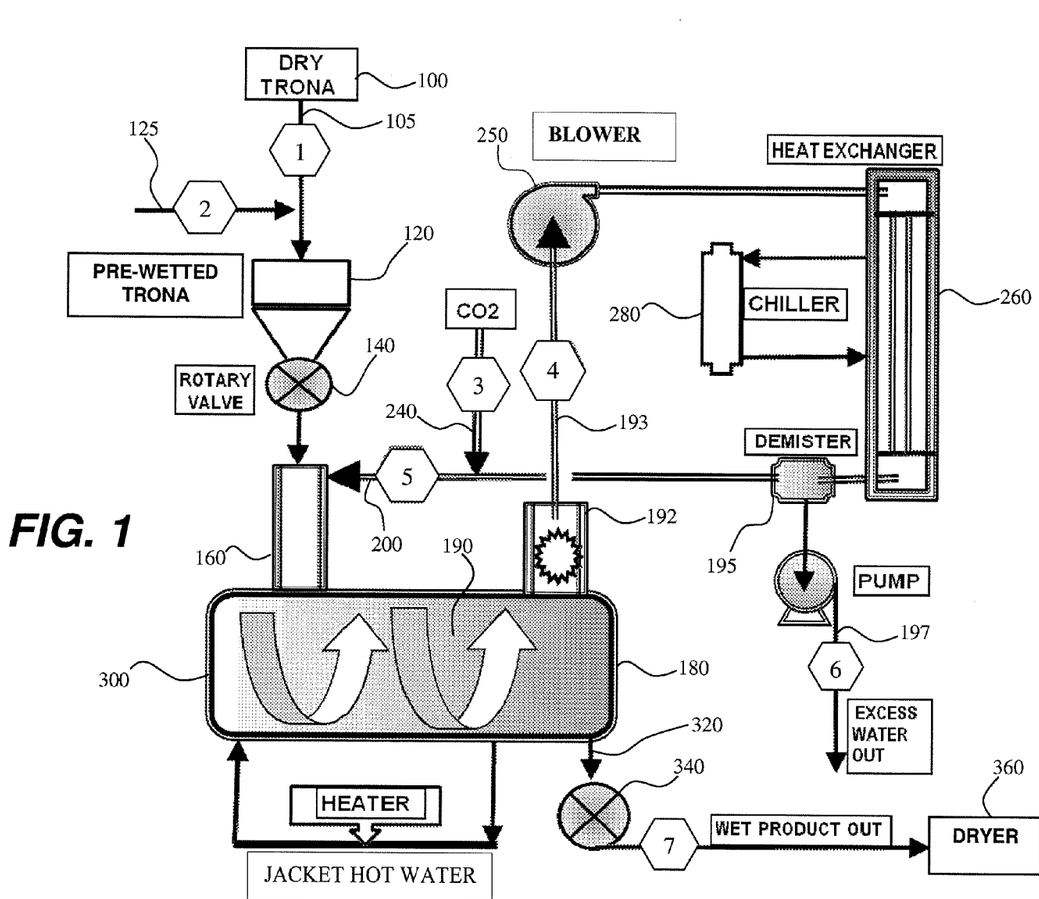
FIG. 1 is an example of a schematic process flow diagram according to the invention.
Figure 2:
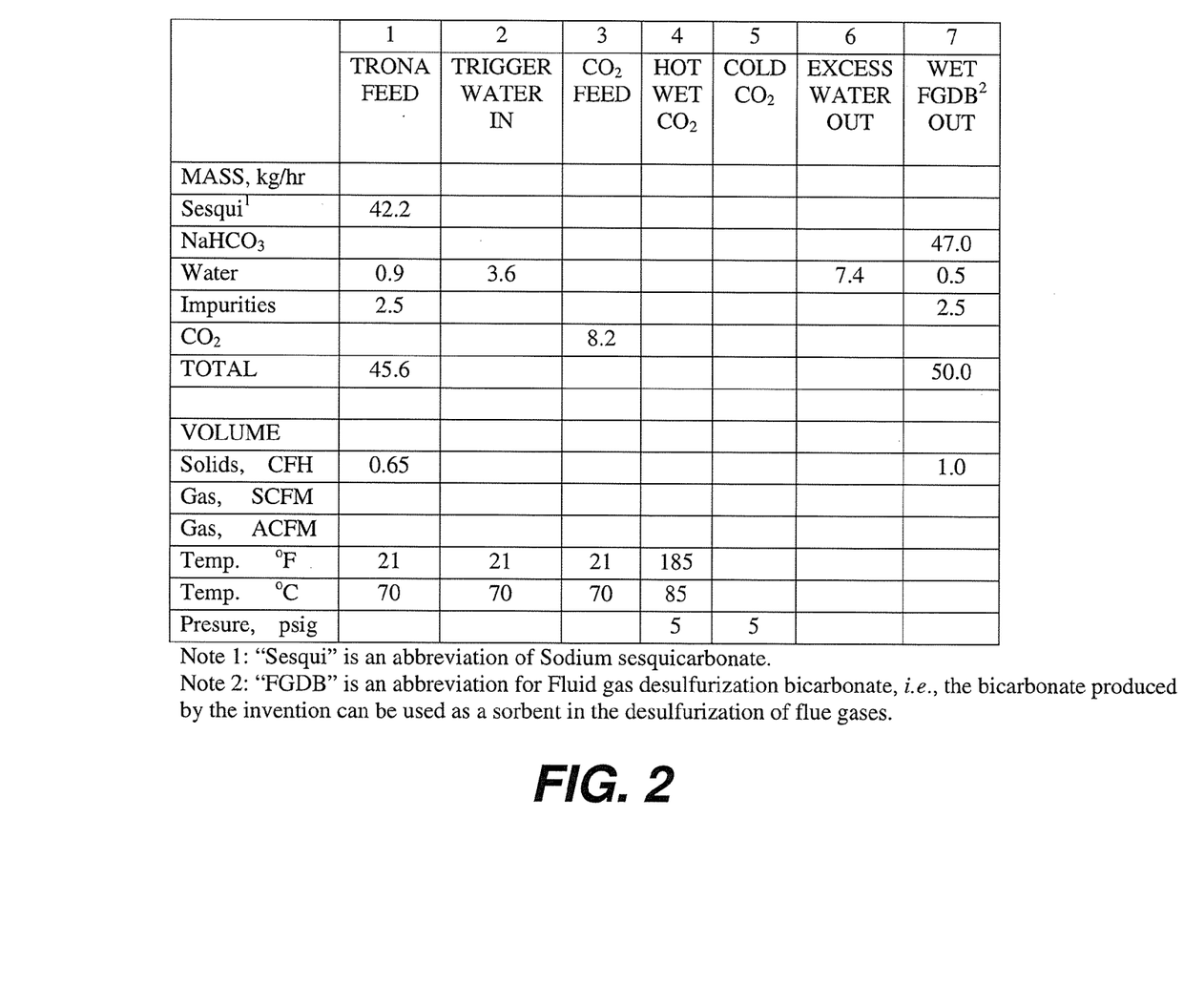
FIG. 2 shows a table of mass and volume data.

FIG. 1 is a schematic flow diagram of one embodiment of the invention. Numeric labels shown in hexagonal boxes correspond to column numbers in Table 1 (FIG. 2). Dry Trona particles are fed from hopper 100 through feed conduit 105 to an inline mixer 120. The inline mixer 120 can run at any suitable rpm. Trigger water is supplied via conduit 125 such that the trigger water and Trona feed particles are mixed together inside the inline mixer 120 to provide pre-wetted Trona particles. The pre-wetting step is designed to place a liquid water film around each particle thereby creating a liquid water boundary layer around each particle. It should be understood that the trigger water can be added directly to the inline mixer 120, and any suitable inline mixer can be used. The amount of trigger water added to inline mixer 120 is sufficient to form very thin substantially uniform films of water around the Trona particles to provide pre-wetted Trona particles. A continuous supply of $CO_2$ may be added to the trigger water line to disperse it more uniformly using an atomizing nozzle. Addition of $CO_2$ into the trigger water speeds the reaction up. The $CO_2$ is pre-absorbed in the water before the Trona particles are wetted enabling the reaction to start immediately after the contact with $CO_2$ saturated trigger water.

The pre-wetted Trona particles are directed via a rotary valve 140 and reactor vessel inlet port 160 to a reactor vessel 180; a screw conveyor (not shown) can be used to transfer the pre-wetted Trona particles to the inlet port 160. A gas comprising $CO_2$ is supplied via gas mixture feed line 200. The pre-wetted Trona particles are brought into contact with $CO_2$ and thence mixed, preferably by radial mixing, in reactor vessel 180. If desired, an inert gas, such as air or nitrogen, may be included in the gas mixture. The temperature of the gas mixture is controlled by heat exchanger 260 paired with chiller 280 and blower 250; the chiller 280 cools the heat exchanger 260 which in turn cools the gas mixture comprising $CO_2$ and water vapor. The temperature of the gas mixture is selected to maintain the temperature range inside vessel 180 preferably at about 185° F. The temperature of the recycled gas mixture ensures that the contents of the reactor vessel 180 are not overheated causing unwanted thermal decomposition of the desired bicarbonate product. The hot water jacket 300 helps to reduce or eliminate caking on the interior surface of the reaction vessel 180. The hot water jacket temperature is kept slightly above the temperature inside the reactor vessel 180.

The reactor vessel 180 is internally or externally agitated to reduce agglomeration of the Trona particles inside the reactor vessel 180. The reactor vessel 180 can be any suitable reactor such as a cylindrical tubular reactor capable of radial mixing such as a ribbon blender. While not essential it is preferred that backward and forward mixing, i.e. axial mixing are minimized inside the reactor vessel 180. A paddle back-angle of 2-20 degrees retards the forward flow and maximizes the breakthrough time of the residence time distribution curve. Back mixing is not critical, but if excessive, it increases the reactor hold up and will require larger reactor volume than necessary. From a stand point of obtaining the highest possible carbonation rate, it is essential to provide enough radial mixing so that the bulk diffusion of $CO_2$ does not become the carbonation rate limiting step. A water jacket 300 is disposed around at least part of the reactor vessel 180.

The Trona particles in the reaction vessel 180 are carbonated inside and across the very thin liquid boundary layer. The reaction temperature inside reactor vessel 180 is maintained within the range of from about 125° F. and 185° F., about 140° F. to about 185° F., and more preferably of about 160° to about 185° F., and still more preferably of about 165° to about 185° F.; given that the carbonation reaction is exothermic heat is removed from inside the reactor vessel 180 by removing heat energy from the gas mixture by means of heat exchanger 260 coupled to blower 250 and chiller 280. A reaction temperature of about 185° F. is considered ideal for converting virtually all of the available sodium carbonate in the Trona particles into a reacted composition comprising sodium bicarbonate product with conversion of Trona to between 25% to 100%, preferably at least 95%, and more preferably about 98% or higher conversion inside the reactor vessel 180.

The reacted composition exits the reactor vessel 180 through discharge port 320 and rotary valve 340 and thence to a cooler-dryer 360 where moisture is removed from the reacted composition to provide a product with a moisture content between 0% to 2% by weight. Drying is conducted at relatively low temperatures preferably below 200° F. and preferably in the presence in an atmosphere of carbon dioxide to provide a product having a 99+% sodium bicarbonate content by weight (not counting the soluble and insoluble impurities).

It should be understood that the drying step employing cooler-dryer 360 is not always necessary to provide a desired end product. More specifically, the reaction stoichiometry as employed in this invention produces a product with a sufficient low water content which can be suitable for many uses without requiring the use of an additional drying step. Thus a drying step employing, for example, such devices as cooler-dryer 360 may not be necessary.

While the reactor vessel 180 can be operated in batch mode, it is preferred that the reactor vessel 180 is operated in continuous mode. To operate the reactor vessel 180 in continuous mode requires continuous supply of pre-wetted Trona particles from the mixer 120 and a sufficient rate of discharge of the reacted composition emerging from discharge port 320.

The term "dry" carbonation was introduced by Krieg, et al. in U.S. Pat. No. 4,459,272 as a contrast to "wet" classical carbonation process performed in large columns containing dissolved sodium bicarbonate as explained in the Background section. The term "dry" is not correct because the carbonation reaction needs water to start and proceed. The "dry" carbonation is also "wet". Water serves two roles: it is a media for the reaction to occur in and it is also a reactant as can be seen from the stoichiometric equation shown below.

Without being bound by any particular theory for the improved carbonation rates achieved by the current invention it is thought that the reason for achieving fast carbonation reaction rates is a combination of using a small particle size of different carbonates, such as sodium Sesquicarbonate found in Trona, sufficient water provided initially as trigger water to form a narrow liquid boundary layer of water surrounding each Trona particle. The boundary layer defines an outside boundary layer surface and an inner boundary layer surface of each Trona particle.

During the boundary layer carbonation reaction of the present invention $CO_2$ dissolve in the liquid layer from the outside boundary layer surface, while sodium Sesqui carbonate dissolves from the inner boundary layer surface. Dissolved $CO_2$ reacts with the sodium carbonate from Sesqui to form sodium bicarbonate. Sodium bicarbonate form by the reaction and from sodium Sesqui carbonate crystallizes inside the boundary layer and small crystals grow in and through the inside surface of the boundary layer. The crystals produced by the present invention have specific surface areas between 0.4 $m^2/g$ and 2.5 $m^2/g$ as well as between 0.7 $m^2/g$ and 1.6 $m^2/g$ and, as such, represent a significant breakthrough in the field of sodium bicarbonate manufacture. Sodium bicarbonate produced by prior art methods is typically associated with specific surface areas of 0.3 $m^2/g$ or less. Thus, in flue gas desulfurization using prior art manufactured sodium bicarbonate there is a need for in-situ grinding before injection of the sodium bicarbonate but with the sodium bicarbonate produced by the present invention there is no need or less of a need for in-situ grinding.

Boundary layer carbonation is an example of gas-liquid-solid reactions. The carbonation reaction proceeds all the way to the center of each particle if the CO2 is constantly supplied to the boundary layer. The reaction rate depends on Trona particle size, the smaller the particles the faster the reaction. The carbonation of Trona will go the fastest with micronized particles. The low Trona particle size limit is the tendency to agglomerate which increases as particle size decreases. Agglomerated particle carbonation rate is dramatically reduced, the higher agglomeration the slower the reaction. One difference is the reactor size because, in a sense, each particle is a reactor. Also, the boundary layer carbonation results in a porous sodium bicarbonate particle (agglomerate) looking like a sponge or containing well defined very small sodium bicarbonate crystals up to three orders of magnitude smaller than the starting Trona crystal. These small sodium bicarbonate particles are irregularly arranged and held together by many contact points. The classical solution carbonation produces solid regular or irregular mono crystals of sodium bicarbonate with high particle density and low specific surface area. The boundary layer carbonation produces large agglomerates (10-20% larger than the starting Trona crystals). The agglomerate consists of very small sodium bicarbonate crystals (quite often smaller than 10 microns). This small size results in higher surface area and enables faster and more effective reaction in the flue gas desulfurization than normally used sodium bicarbonate crystals. An additional commercial advantage of larger agglomerates comprising of very small sodium bicarbonate crystals is that they may not need to be milled before injection into stacks for flue gas desulfurization. This eliminates a complicated and costly step. The term boundary layer reaction could be extended to other gas-liquid-solid or gas solid reactions, like boundary layer sulfation, chlorination, etc.

While the present invention is not bound by any particular theory for explaining a 99+% conversion rate of carbonate to bicarbonate in less than 15 minutes reactor residence time with high conversion rates in as little as 10 to 12 minutes residence time in the reactor vessel 180. A carbonation residence time of 2 to 45 minutes, more preferably 7 to 15 minutes is regarded as suitable to provide a reacted composition. Such a fast conversion of carbonate to bicarbonate is achieved by: (1) the use of Trona particles in the size distribution ranges as described in this application, (2) pre-wetting the Trona particles to provide a water film around each particle, and (3) removal of excess water from the reactor vessel by removing water from the discharged $CO_2$ line to ensure dry carbonation of the pre-wetted Trona particles to produce a reacted composition that requires little or no energy to dry than prior art wet carbonation systems. Liquid water may not be added during the boundary layer carbonating step.

As indicated in the stoichiometric equation, sodium Sesqui carbonate contains an extra molecule of water which needs to be removed from the reactor to obtain dry product. Further increase in carbonation rate can be achieved by introducing $CO_2$ into the trigger water before it is contacted with dry Trona. While any suitable mixing means capable of avoiding agglomeration and short-circuiting of Trona to the discharge port before complete conversion in the reactor vessel 180 can be utilized, it is preferred that the mixing means predominately performs radial mixing such as that achievable using a reactor vessel fitted with a ribbon and/or paddle mixing means such as that used in a ribbon and/or paddle blender type reactor.

EXAMPLES

The following examples are intended only to present the invention by way of example and are not intended to limit the scope of the claimed invention.

Example 1

In this theoretical example and using the apparatus of FIG. 1, of which numeric labels shown in hexagonal boxes should be read with reference to the columns shown in Table 1 (FIG. 2). Dry Trona particles are fed from a hopper 100 via line 105 at a rate of 42.2 kg/hr sodium sesquicarbonate to an inline mixer 120. Trigger water is added via trigger water feed line at 125 and subsequently mixed with the Trona particles in inline mixer 120 to provide pre-wetted Trona particles. It should be understood that trigger water can be added directly to the inline mixer 120. The mixer 120 can be any suitable mixer to provide pre-wetted Trona such as, but not limited to, a high RPM paddle mixer capable of mixing the Trona particles with water or an externally vibrated mixing tank. At least 90% of the dry Trona feed at 1 has a particle size range of between 53 microns and 500 microns inclusively. Particle size of Trona could be very fine (between 2 microns and 5 microns inclusively) providing that the mixer used is not causing agglomeration. The rates of trigger water delivery together with the inline mixing action provided by inline mixer 120 are sufficient to provide pre-wetted Trona particles.

The pre-wetted Trona particles are directed via a rotary valve 140 and reactor vessel inlet port 160 to a reactor vessel 180; a screw conveyor (not shown) can be used to transfer the pre-wetted Trona particles from the rotary valve 140 to the reactor vessel 180. A gas mixture comprising $CO_2$ is directed into the reactor vessel 180 via gas mixture feed line 200 and vessel inlet port 160 such that the pre-wetted Trona particles are brought into contact with $CO_2$ and thence mixed therewith inside reactor vessel 180. Alternatively, the gas mixture comprising $CO_2$ is pumped directly into the reactor vessel through a gas entry port (not shown) proximate to reactor vessel inlet port 160 to ensure quick contact with the pre-wetted Trona particles. Alternatively, a portion of $CO_2$ required for complete conversion is added to the trigger water line (not shown) and atomized into the inline mixer or into the reactor vessel in order to increase the reaction rate. Addition of CO2 into the trigger water increases the reaction rate.

If desired, an inert gas, such as air or nitrogen, may be included in the gas mixture. The $CO_2$ directed to the reactor vessel 180 comprises a combination of recycled $CO_2$ and makeup $CO_2$. The makeup $CO_2$ is supplied via gas feed line 240. $CO_2$ has a partial pressure of from 0.2 to 0.9 atmospheres when the total pressure in reactor 180 is 1 atmosphere and at proportionately higher partial pressures at greater total pressures. The total pressure in the reactor 180 can vary between 1 and 20 atmospheres and more preferably is between 1 and 5 atmospheres. The temperature of the gas mixture is controlled by chiller 280 which cools a heat exchanger 260 which in turn cools the gas mixture comprising recycled $CO_2$ supplied via line 193. The higher the pressure of $CO_2$ in the gas mixture the higher the reaction rate. The upper $CO_2$ pressure limit is limited by the additional capital equipment cost compared to the savings from the higher reaction rate.

In one embodiment the gas mixture is a mixture of $CO_2$ and water vapor. However, it is preferred that the water content of the gas mixture is minimized and $CO_2$ percent maximized, and unlike much of the prior art there is no express requirement in the present invention to pump liquid water via nozzles or the like into the interior of the reactor vessel 180. The amount of water in the reactor vessel 180 need only be enough to maintain a boundary layer of liquid water around the particles. Excess reaction trigger water and excess water already present in the sodium sesquicarbonate molecule are removed from the reactor vessel 180 by means of demister 195 and excess water out line 197 downstream of the demister 195. Reaction water is defined as water required for the carbonation of Trona particles. Additional water is required to maintain a medium for reaction in the liquid boundary layer around the Trona particles inside reactor vessel 180.

The temperature of the gas mixture is selected to maintain the correct temperature range inside vessel 180 and more particularly a reaction zone 190 located inside the reactor vessel 180. The carbonation reaction creates excess water. Unreacted humid $CO_2$ exits the reaction zone 190 of reactor vessel 180 through gas discharge port 192 which can include a dust collector. The discharged $CO_2$ is recycled via gas line 193 by blower 250 to the heat exchanger 260 and demister 195. The demister 195 removes the excess water via excess water out line 197. Makeup $CO_2$ is provided via line 240.

The reactor vessel 180 is internally or externally agitated as slow as possible to provide sufficient bulk diffusion CO2 flow rate to reach each particle of Trona, avoid becoming the rate limiting step and still almost completely reduce or eliminate agglomeration of the Trona particles therein. The reactor vessel 180 is preferably a cylindrical tubular reactor with an internal ribbon blender to provide radial mixing of the reactants therein. The reactor vessel 180 defines a reaction zone 190 inside the reactor vessel 180. The reactor vessel 180 is heated by a water jacket 300 to prevent caking on the interior walls of the reactor vessel. The radial mixing means in the reactor vessel 180 can run at any suitable rpm, such as 50 rpm.

The reaction zone 190 is maintained at a carbonation reaction temperature in the range between 140° F. to about 185° F., and more preferably of about 160° to about 185° F., and still more preferably from about 170° to about 185° F.; the optimum temperature being about 185° F. Reaction temperature in vessel 180 is controlled by the rate of $CO_2$ recycled as provided by blower 250. The blower 250 can have a variable frequency drive. Recycle rate also determines the rate of excess water removal which is controlled to ensure an optimum amount of water is maintained to maintain a boundary layer around the Trona particles. Too much water will result in agglomeration and reaction rate reduction. Not enough water will reduce the $CO_2$ dissolution rate in the boundary layer and consequently reduce the overall carbonation rate. Too fast $CO_2$ recycle rate can create a dust issue and could cause problems at discharge port/dust collector 192. It has been surprisingly found that particles in the size range 125 to 250 micron range with a surrounding film of water and a reaction zone temperature of 185° F. (85° C.) for short periods of time (from 9 minutes to 15 minutes residence time in reaction zone 190) produces a reacted product having a high percentage of bicarbonate (typically over 95% conversion); particles smaller than 125 microns achieved conversion high as 99+% in 8-12 minutes. The reacted composition is dried to provide a carbonated product having a sodium bicarbonate content between 95% to 99+% of sodium bicarbonate by weight (not counting impurities).

The carbonation reaction inside reactor vessel 180 is exothermic and heat can be removed from the reaction zone 190 inside the reactor vessel 180 by adjusting temperature of the gas mixture by means of blower 250 recycle rate through heat exchanger 260 in turn cooled by chiller 280. A minor temperature control can also be accomplished by chilled water temperature variation. A reaction temperature of about 185° F. and a dry Trona particle size as discussed above is considered ideal for converting about 99+% of the available sodium carbonate in the Trona particles into a product composition comprising sodium bicarbonate product in about 15 minutes of residence time inside the reactor vessel 180. The bicarbonate product exits the reactor vessel 180 through product discharge line 320 and via rotary valve 340 and thence to a cool dryer 360 where moisture is removed from the bicarbonate product. Drying is conducted at relatively low temperatures preferably below 200° F. and preferably under $CO_2$ pressure of 1-2 psi.

Example 2

Figure 3:
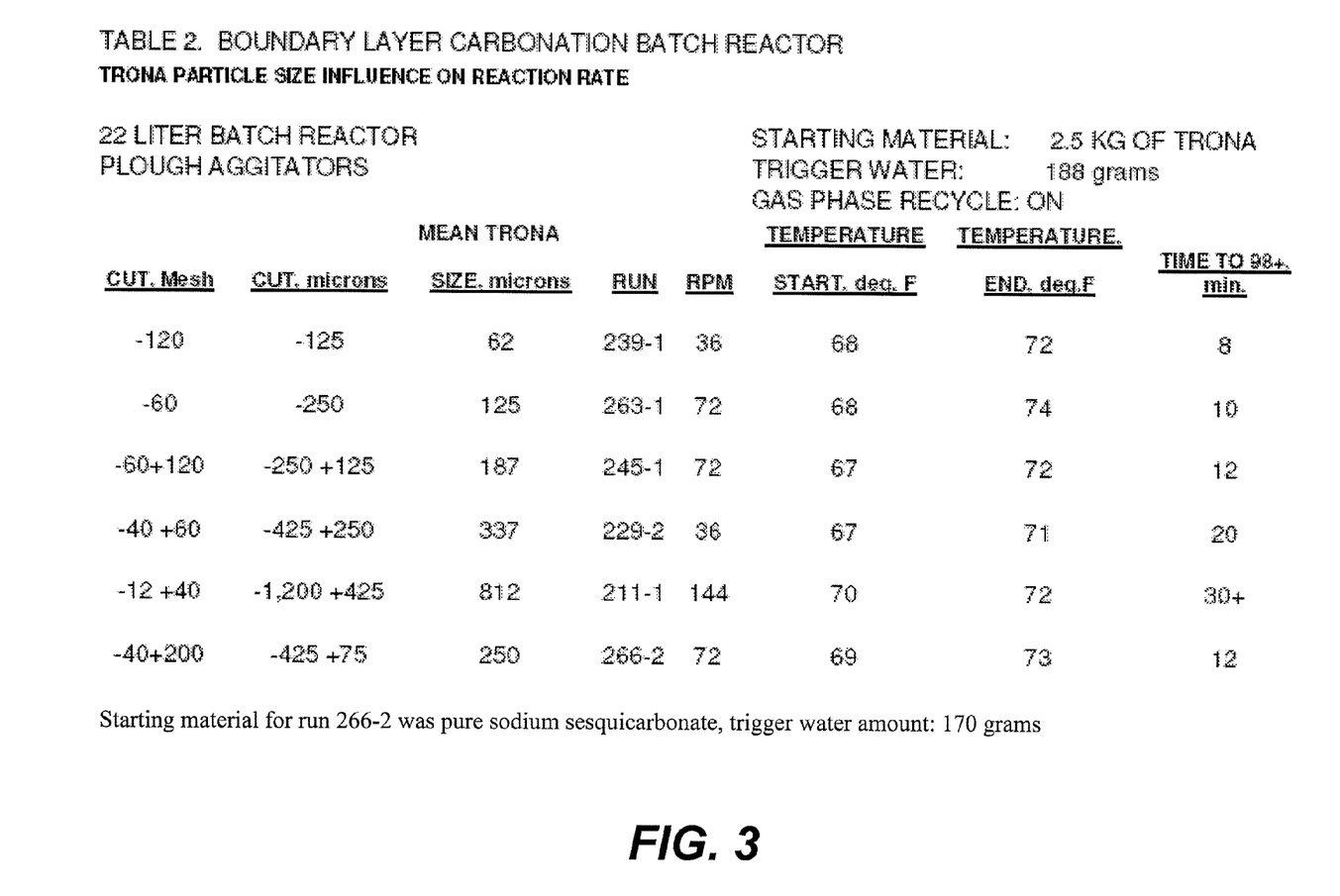
FIG. 3 shows a table of batch experimental data.

A series of batch runs were performed as described and tabulated in FIG. 3. More specifically, batch runs were performed to determine the role of particle size in conversion of carbonate to bicarbonate. It was determined that particle size was an important variable.

Without being bound by any particular theory for the improved carbonation rates achieved by the current invention it is thought that the reason for achieving such results is a combination of using a small particle size of carbonate, such as sodium sesquicarbonate found in Trona, sufficient water provided initially as trigger water to form a narrow liquid boundary layer of water surrounding each particle. The boundary layer defines an outside boundary layer surface and an inner boundary layer surface. During carbonation $CO_2$ dissolve in the liquid layer via the outside boundary layer surface, and sodium Sesqui carbonate dissolves from the inner boundary layer surface. Dissolved $CO_2$ reacts with the carbonate from Sesqui to form sodium bicarbonate. Sodium bicarbonate crystallizes on and through the outside surface of the boundary layer. The carbonation reaction proceeds all the way to the center of each particle. The sodium bicarbonate crystals produced have a remarkable large specific surface area in the range 0.7 m²/g to 1.6 m²/g. The carbonation reaction rate is optimum at a temperature of about 185° F.

This patent discloses a boundary layer carbonation process for the production of sodium bicarbonate from Trona. In one embodiment the process comprises the steps of: providing Trona particles from Trona; pre-wetting the Trona particles with water to provide a plurality of pre-wetted Trona particles; and carbonating the pre-wetted Trona particles to convert the pre-wetted Trona particles into sodium bicarbonate made up of crystals with large specific surface area in the range 0.7 m²/g to 1.6 m²/g. The sodium bicarbonate of the invention provides economical advantages for flue gas desulfurization above sodium bicarbonate produced by prior art methods. Specifically, the larger surface area of the crystals produced by the invention translates into lower volume amounts of sodium bicarbonate required to desulfurize a given amount of flue gas.

What is claimed is:

1. A process for converting a sodium carbonate containing ore into sodium bicarbonate, the process comprising:
    adding the sodium carbonate containing ore to a reactor vessel in the form of particles having a size range of 1 micron to 4,000 microns;
    adding $CO_2$ to the reactor vessel; and
    reacting the particles of the sodium carbonate containing ore with the $CO_2$ in the presence of water via boundary layer carbonation while providing mixing that is sufficient to counter agglomeration of the particles of the sodium carbonate containing ore and thus form a reacted composition comprising sodium bicarbonate having a surface area between 0.4 m²/g and 2.5 m²/g with a conversion of 25% to 100%.

2. The process according to claim 1, wherein the sodium carbonate containing ore comprises Trona.

3. The process according to claim 1, wherein the particles of the sodium carbonate containing ore have a size range of 37 to 500 microns.

4. The process according to claim 1, wherein reacting comprises forming a liquid water film around the particles.

5. The process according to claim 1, wherein the reacting is carried out at a temperature of about 125° F. to about 185° F.

6. The process according to claim 1, wherein said mixing comprises predominately radial mixing.

7. The process according to claim 1, wherein said mixing is sufficient to prevent $CO_2$ bulk transfer from being the boundary layer carbonation rate limiting step.

8. The process according to claim 1, further comprising removing excess water from the reaction by removing water from a $CO_2$ containing recycle stream.

9. The process according to claim 8, comprising directing the $CO_2$ containing recycle stream to a demister.

10. The process according to claim 9, wherein, prior to said step of directing the $CO_2$ containing recycle stream to a demister, further comprising directing the $CO_2$ containing stream to a heat exchanger.

11. The process according to claim 8, further comprising directing the $CO_2$ containing recycle stream through a dust collector.

* * * * *